(12) United States Patent
Kubota et al.

(10) Patent No.: US 6,935,675 B2
(45) Date of Patent: Aug. 30, 2005

(54) RETRACTABLE ROOF FIXING APPARATUS

(75) Inventors: Junichi Kubota, Nagano (JP);
Masakane Yoshizawa, Nagano (JP)

(73) Assignee: Johnan Manufacturing Co., Ltd., Nagano (JP)

( * ) Notice: Subject to any disclaimer, the term of this patent is extended or adjusted under 35 U.S.C. 154(b) by 0 days.

(21) Appl. No.: 10/859,243

(22) Filed: Jun. 3, 2004

(65) Prior Publication Data

US 2004/0262943 A1 Dec. 30, 2004

(30) Foreign Application Priority Data

| Jun. 30, 2003 | (JP) | 2003-186932 |
| Jun. 30, 2003 | (JP) | 2003-187560 |
| Jun. 30, 2003 | (JP) | 2003-187608 |
| Jun. 30, 2003 | (JP) | 2003-187789 |
| Jun. 30, 2003 | (JP) | 2003-187936 |

(51) Int. Cl.[7] ............................................. B60J 7/185
(52) U.S. Cl. ................... 296/121; 296/128; 292/DIG. 5
(58) Field of Search .................. 296/128, 124, 296/107.01, 121; 292/DIG. 5

(56) References Cited

U.S. PATENT DOCUMENTS

| 5,284,378 A | * | 2/1994 | Sautter, Jr. ................. 296/121 |
| 5,678,881 A | * | 10/1997 | Tokarz ........................ 296/121 |
| 6,290,281 B1 | * | 9/2001 | Durrani et al. ............. 296/121 |
| 6,508,502 B2 | * | 1/2003 | Willard ....................... 296/121 |
| 6,520,560 B2 | * | 2/2003 | Schutt et al. ............... 296/121 |
| 6,758,511 B2 | * | 7/2004 | Taylor et al. ............... 296/121 |
| 6,767,047 B2 | * | 7/2004 | Eichhorst et al. .......... 296/121 |

FOREIGN PATENT DOCUMENTS

| JP | 10-207073 A1 | 1/2000 |
| JP | 2000-005788 A1 | 7/2001 |

* cited by examiner

*Primary Examiner*—Jason Morrow
(74) *Attorney, Agent, or Firm*—Joseph P. Farrar (57) ABSTRACT

A retractable roof fixing apparatus capable of drawing the roof to a vehicle body to be snugly fixed thereto by automatically retracting a striker engaged with a latch by a sufficient distance. The retractable roof fixing apparatus comprises: a striker fixed on a roof; a base plate fixed on a body of a vehicle; a slide plate slidably attached to the base plate in a direction of movement of the striker; a latch rotatably mounted on the slide plate that engages the striker with a rotation of the latch; a cam rotatably mounted on the base plate; and a motor that rotates the cam, wherein the motor operates when the striker engages the latch to rotate the cam so as to slide the slide plate away from the roof.

9 Claims, 7 Drawing Sheets

RETRACTABLE ROOF FIXING APPARATUS

CLAIM OF PRIORITY

This application claims priority from Japanese Patent Application Nos. 2003-186932, 2003-187608, 2003-187789, 2003-187560 and 2003-187936, each titled "Retractable Roof Fixing Apparatus" and filed on Jun. 30, 2003, the entire contents of which are incorporated herein by reference.

BACKGROUND OF THE INVENTION

1. Field of the Invention

The present invention relates to roof fixing apparatus, and more particularly, to a roof fixing apparatus for fixing a retractable roof provided on a convertible automotive vehicle.

2. Description of Related Art

Conventionally, a convertible automotive vehicle is provided with a retractable roof to cover the interior of the vehicle, so as to provide protection against cold weather and rain. Typically, such a retractable roof is mounted at a base to a rear part of the body of the vehicle, with a front end of the roof moved to extend and to retract the roof. If left exposed when not in use, however, the roof not only impedes the rear view of the operator of the vehicle but is also unsightly, susceptible to dust and dirt, and may experience color fading.

As a result, the retractable roof is stored within a rear portion of the body of the vehicle when not in use and covered by a storage cover. To be used, the cover is lifted and the roof is extended.

Accordingly, after the retractable roof is separated from the vehicle and released from storage, it is desirable to close the storage cover, set the roof on top of the cover and then fix the base of the roof to the vehicle body by a lock device.

As automotive vehicle lock devices, there is known a device in which a striker is mounted to a door or the body of the vehicle while a latch is mounted oppositely, so that when the door contacts the body the impact of the contact rotates the latch, causing the latch to engage the striker and thus secure the door. Such an arrangement is disclosed, for example, in Japanese Laid-Open Patent Publication Nos. 12-27511 and 2001-193328.

In the conventional lock device described above, a length from a point at which the striker contacts the latch to a point at which the latch fully engages the striker and the door is closed coincides with a distance through which a notch that engages the striker moves with the rotation of the latch, and is no more than approximately 5–7 mm.

In the case of a door lock device that fixes the door in a state in which a hard, heavy door contacts an edge part of an opening in the vehicle body, such distance as described above are sufficient. However, when fixing a retractable roof to the vehicle body, such minimal distances create a risk that vibration during operation of the vehicle might open a gap between the roof and the body.

SUMMARY OF THE INVENTION

Accordingly, the present invention is conceived as a response to the above-described disadvantage of the conventional art, and has as an object to provide a retractable roof fixing apparatus that can snugly draw the roof to a vehicle body and fix the roof to the body by greatly retracting a striker.

Another object of the present invention is to provide a retractable roof fixing apparatus that securely draws the roof to a vehicle body and fixes the roof to the body by driving a motor that rotates a cam that greatly retracts a striker engaging a latch.

According to the retractable roof fixing apparatus described above, the retractable roof fixing apparatus can limit an increase in load on the motor even when a lifting force applied from the roof to the latch approaches a retraction limit position.

Another and further object of the present invention is to provide a retractable roof fixing apparatus that can fully draw the roof to a vehicle body and securely fix the base end of the roof to the body by greatly retracting the striker engaging the latch, in which the slide plate supporting the latch slides stably.

Still another and further object of the present invention is to provide a retractable roof fixing apparatus that can fully draw the roof to a vehicle body and securely fix the base end of the roof to the body by greatly retracting the striker engaging the latch, and moreover, that prevents a geared cable that connects the motor and the cam from buckling from the reaction when the striker is released.

Still yet another and further object of the present invention is to provide a retractable roof fixing apparatus that can fully draw the roof to a vehicle body and securely fix the base end of the roof to the body by greatly retracting the striker engaging the latch, with the rotation of the cam is restricted so as to securely engage the latch with the striker as well as to hold the striker at a retracted position when the slide plate supporting the latch is at a top dead center position or a bottom dead center position.

In order to achieve the above-described objects of the present invention, according to a first aspect of the invention there is provided a retractable roof fixing apparatus comprising:

a striker fixed on a roof;

a base plate fixed on a body of a vehicle;

a slide plate slidably attached to the base plate in a direction of movement of the striker;

a latch rotatably mounted on the slide plate that engages the striker with a rotation of the latch;

a cam rotatably mounted on the base plate; and a motor that rotates the cam, wherein the motor operates when the striker engages the latch to rotate the cam so as to slide the slide plate away from the roof.

According to the invention described above, when fixing the roof, a striker mounted on the roof strikes a latch, the impact of which causes the latch to rotate and engage the striker. When the striker and latch are engaged, the motor rotates the cam, sliding a slide plate and the latch mounted thereon away from the roof, thus drawing the latch-engaged striker, together with the roof, toward the body of the vehicle.

Preferably, the base plate is provided with a guide slot in the direction of movement of the striker, the slide plate has a slide projection that engages the guide slot, and the cam has a cam slot that engages the slide projection to slide the slide projection along the guide slot as the cam rotates.

Additionally, in order to achieve the above-described objects of the present invention, according to a second aspect of the present invention there is provided the retractable roof fixing apparatus described above, wherein the slide plate has a slide projection, the cam has a cam slot that engages the cam to slide the slide projection in the direction of movement of the striker with a rotation of the cam, and the cam slot has a shape that gradually decreases retraction when the slide projection approaches a retraction limit position.

Preferably, the base plate is provided with a guide slot in the direction of movement of the striker, the slide projection engages the guide slot, and the shape of the cam slot at an engaging portion that engages when the slide projection approaches an end portion opposite the roof of the guide slot is such that an angle of intersection between the engaging portion and the guide slot gradually approaches a right angle with the rotation of the cam.

According to the invention described above, when fixing the roof, a striker mounted on the roof strikes a latch, the impact of which causes the latch to rotate and engage the striker. When the striker and latch are engaged, the motor rotates the cam, sliding a slide plate and the latch mounted thereon away from the roof, thus drawing the latch-engaged striker, together with the roof, toward the body of the vehicle.

When the striker, latch and slide plate approach the retraction limit position, the force of the roof attempting to lift the latch and slide plate upward gradually increases, but because the extent to which the slide projection is retracted gradually diminishes, the cam can be rotated with minimal force, thus offsetting an increase in the force attempting to counter-rotate the cam and making it possible to limit the load on the motor.

Additionally, in order to achieve the above-described objects, according to a third aspect of the present invention there is provided the retractable roof fixing apparatus described above, wherein the base plate has lateral slots along both lateral portions thereof, the lateral slots extending in a direction of movement of the striker, and further comprising sliders mounted at top and bottom portions along both lateral portions of the slide plate slidably engaging the lateral slots.

Preferably, the base plate is provided with a guide slot situated between and parallel to the lateral slots, a slide projection provided on an intermediate portion of the slide plate slidingly engages the guide slot, and the cam is provided with a cam slot that engages the slide projection and slides the slide projection along the guide slot as the cam rotates.

According to the invention described above, when fixing the roof, a striker mounted on the roof strikes a latch, the impact of which causes the latch to rotate and engage the striker. When the striker and latch are engaged, the motor engages and rotates the cam, sliding a slide plate and the latch mounted thereon away from the roof, thus greatly drawing the latch-engaged striker, together with the roof, toward the body of the vehicle.

Additionally, in order to achieve the above-described objects, according to a fourth aspect of the present invention there is provided the retractable roof fixing apparatus described above, further comprising: a geared cable connecting the motor and the cam; a first spring disposed between the slide plate and the base plate urging the slide plate toward the roof; and a second spring disposed between the cam and the base plate rotating the cam in a direction that draws the slide plate toward the roof.

Preferably, the first spring is disposed along each lateral surface of the slide plate and the base plate so as to urge the slide plate toward the roof.

According to the invention described above, when fixing the roof, a striker mounted on the roof strikes a latch, the impact of which causes the latch to rotate and engage the striker. When the striker and latch are engaged, the motor rotates the cam that is connected to the motor by a geared cable, sliding a slide plate and the latch mounted thereon away from the roof, thus greatly drawing the latch-engaged striker, together with the roof, toward the body of the vehicle.

When the striker is released from the latch, a tensile force exerted on the geared cable via the cam by the force of the striker lifting the latch suddenly disappears. However, the springs tensioning the slide plate and the cam apply a tensile force to the geared cable to prevent the geared cable from buckling.

Additionally, in order to achieve the above-described objects, according to a fifth aspect of the present invention there is provided the retractable roof fixing apparatus described above, wherein, the base plate is provided with a guide slot extending in a direction of movement of the striker, the slide plate has a slide projection slidingly engaging the guide slot, and the cam is provided with a pair of cam slots that engages the slide projections and slides the slide projections along the guide slots as the cam rotates, end portions of the guide slots having a straight portion disposed substantially perpendicularly to the guide slots when the slide projections reach end portions of the cam slots.

According to the invention described above, when fixing the roof, a striker mounted on the roof strikes a latch, the impact of which causes the latch to rotate and engage the striker. When the striker and latch are engaged, the motor engages and rotates the cam, sliding a slide plate and the latch mounted thereon away from the roof, thus greatly drawing the latch-engaged striker, together with the roof, toward the body of the vehicle.

When the slide projections are at end portions of the guide slots, at a top dead center position and a bottom dead center position, the edge portions of the cam slots formed as straight lines are disposed perpendicular to the guide slots, such that, even with a force exerted so as to slide the slide projections along the guide slots, such force acts at right angles to the cam slots, and therefore the cam does not rotate, and as a result, the slide plate does not slide without the motor being engaged.

Other objects, features and advantages of the present invention will be apparent from the following description when taken in conjunction with the accompanying drawings, in which like reference characters designate the same or similar parts throughout the figures thereof.

DETAILED DESCRIPTION

Preferred embodiments of the present invention are now described in detail, with reference to the accompanying drawings.

FIGS. 7A, 7B, 7C and 7D are diagrams showing steps in a process of retracting and storing the roof.

Figure 7A:
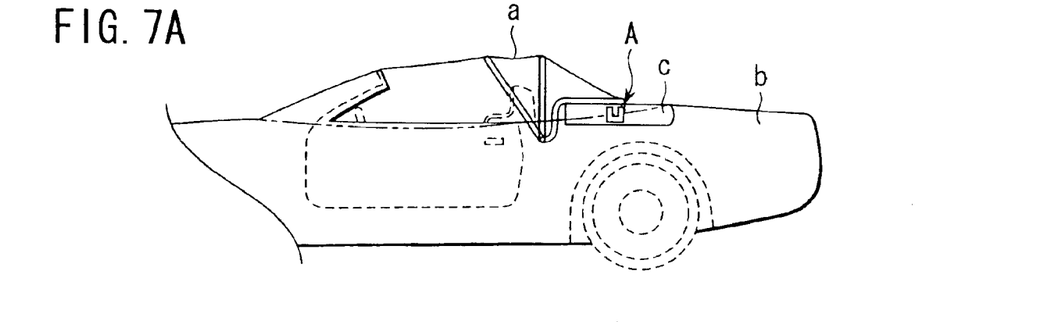
FIGS. 7A, 7B, 7C and 7D are diagrams showing steps in a process of retracting and storing the roof.

As shown in FIG. 7A, the retractable roof fixing apparatus of the present invention fixedly mounts a base portion of a roof a on a cover c on a body b of a vehicle in such a way that the cover c can be opened and closed, and is comprised of a striker 1 mounted on the base of the roof a and a main unit mechanism 2 mounted on the cover c.

Figure 7B:
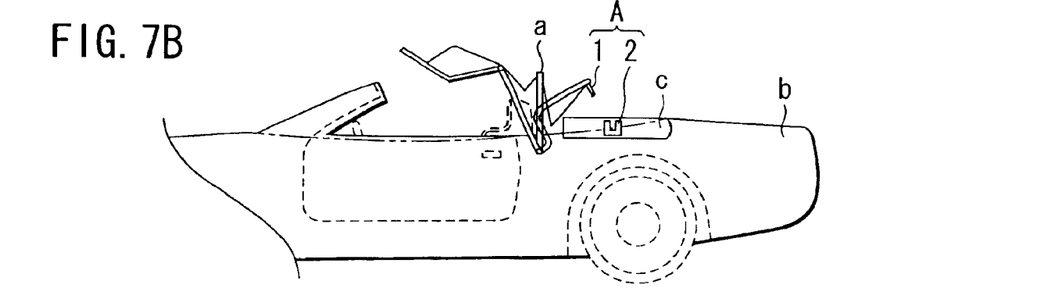
Figure 7C:
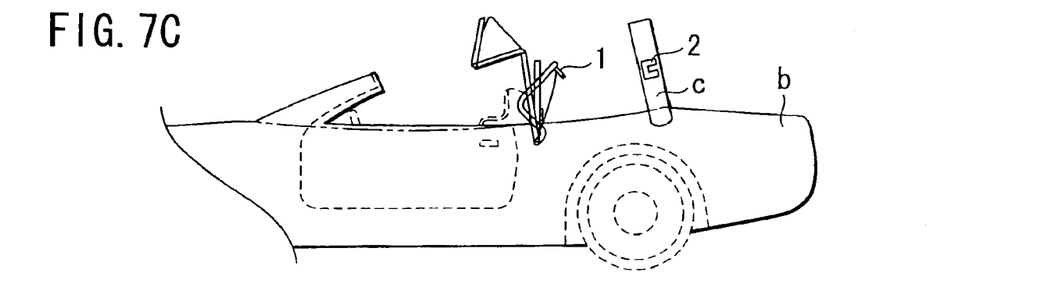
Figure 7D:
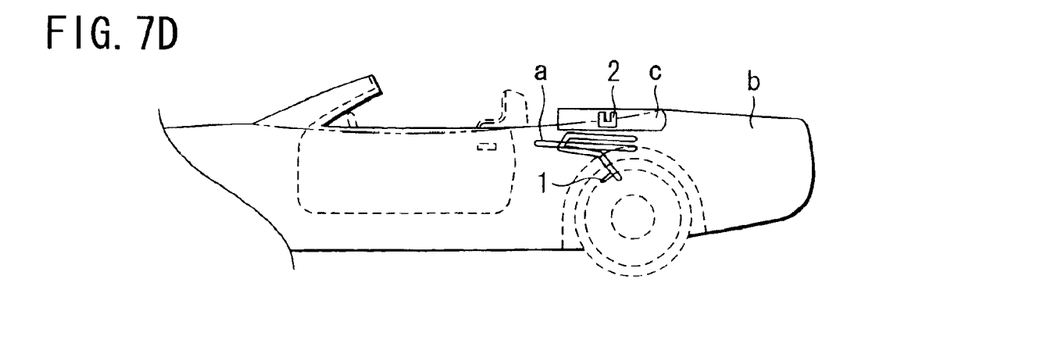

When the roof a is closed (that is, retracted), as shown in FIG. 7B, the retractable roof fixing apparatus A is released, the base of the roof a is released from the body b, and thereafter, as shown in FIG. 7C, the cover c is opened and the roof a is folded, and then, as shown in FIG. 7D, the folded roof a is stored in a rear part of the body b and the cover c is closed.

Figure 3:
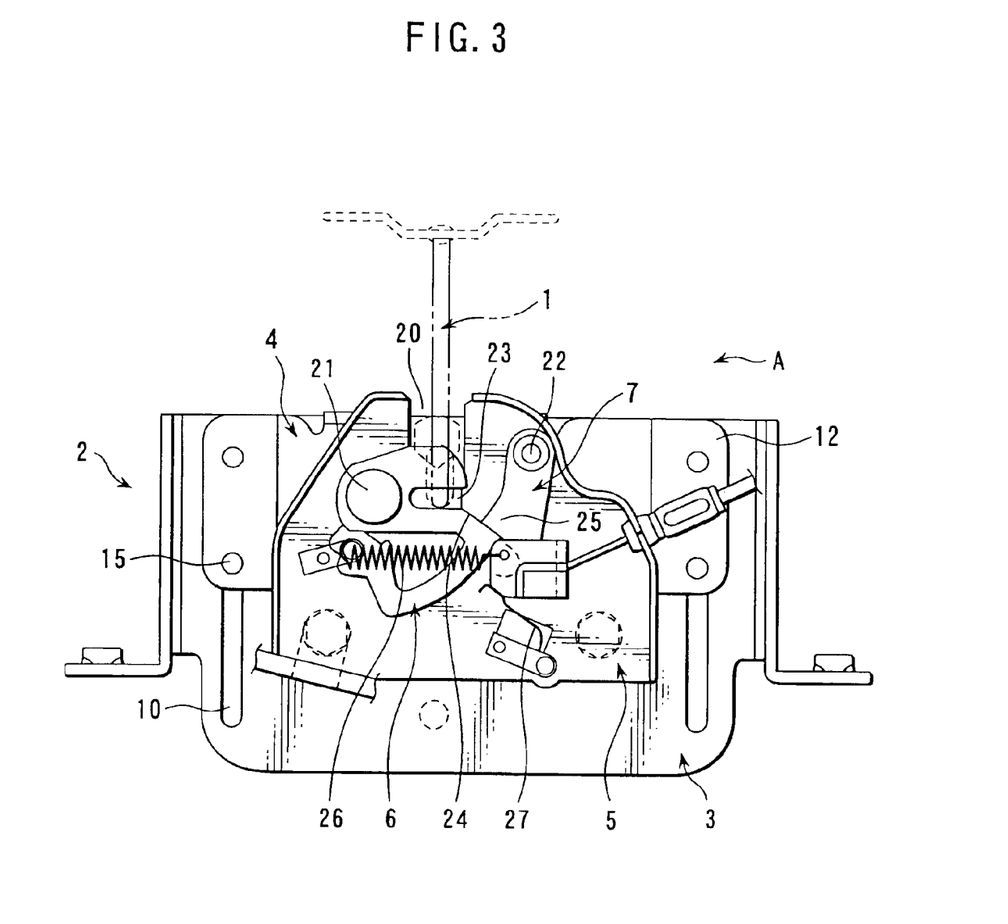
FIG. 3 is a diagram showing a front view of the retractable roof fixing apparatus according to one embodiment of the present invention, in a state in which the roof is extended.
Figure 4:
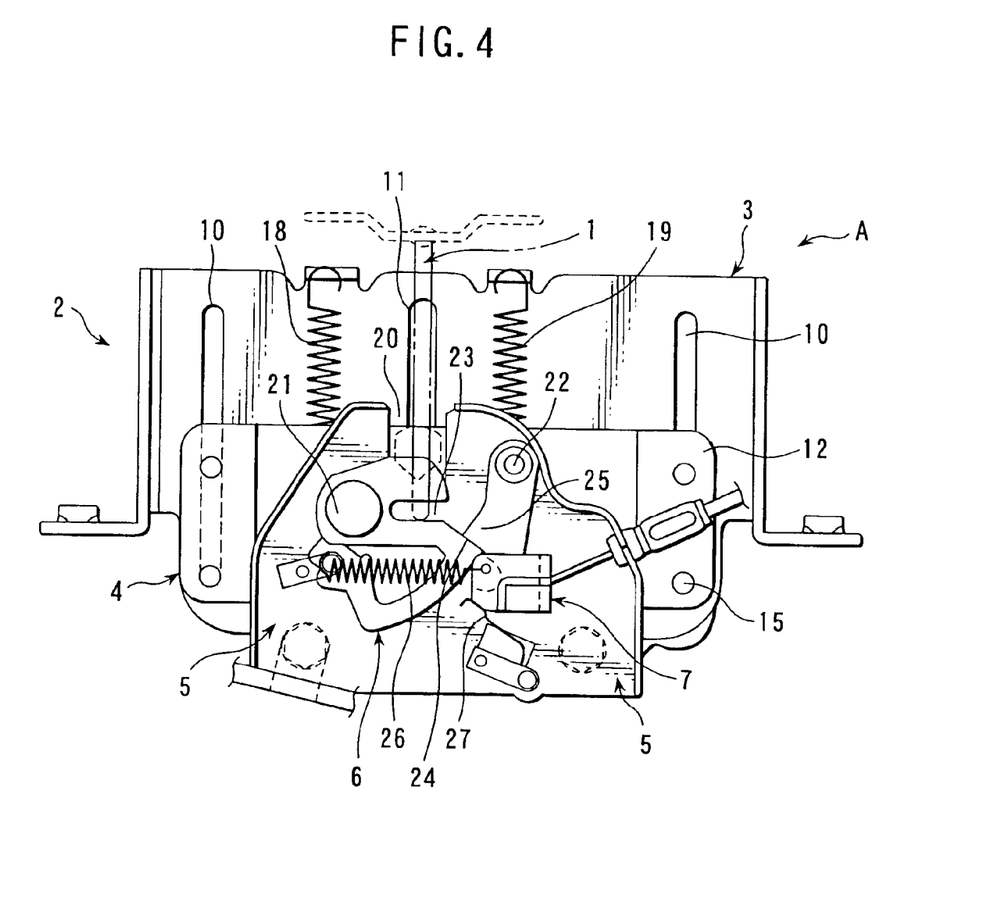
FIG. 4 is a diagram showing a front view of the retractable roof fixing apparatus according to one embodiment of the present invention, in a state in which the striker is retracted.

The striker 1 is a metal rod bent generally in the shape of a staple and mounted so that the base of the roof a projects toward the body b, as shown in FIGS. 3 and 4.

The main unit mechanism 2, as shown in FIGS. 1, 2, 3, 4 and 5, is comprised of a base plate 3 mounted on the cover c, a slide plate 4 slidably mounted on the base plate 3, a cover plate 5 mounted on the slide plate 4, a latch 6 and a detent lever 7 rotatably mounted on the cover plate 5, a cam 8 rotatably attached to the base plate 3, and a motor 9 that rotates the cam 8.

Figure 1:
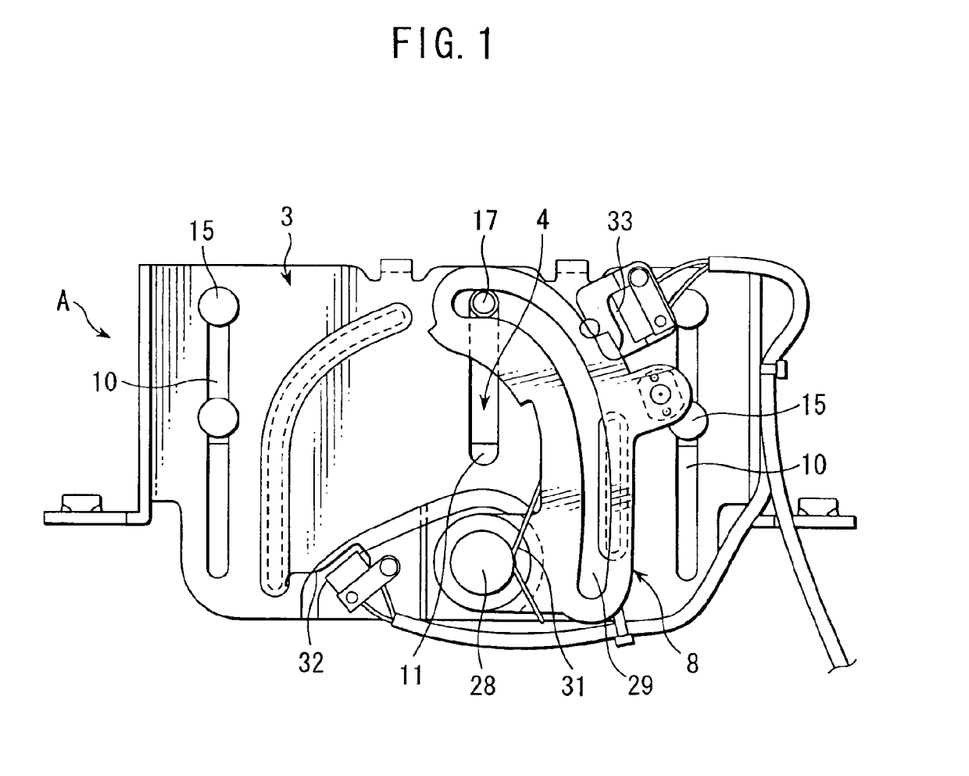
FIG. 1 is a diagram showing a rear view of a retractable roof fixing apparatus according to one embodiment of the present invention, in a state in which the roof is extended.
Figure 2:
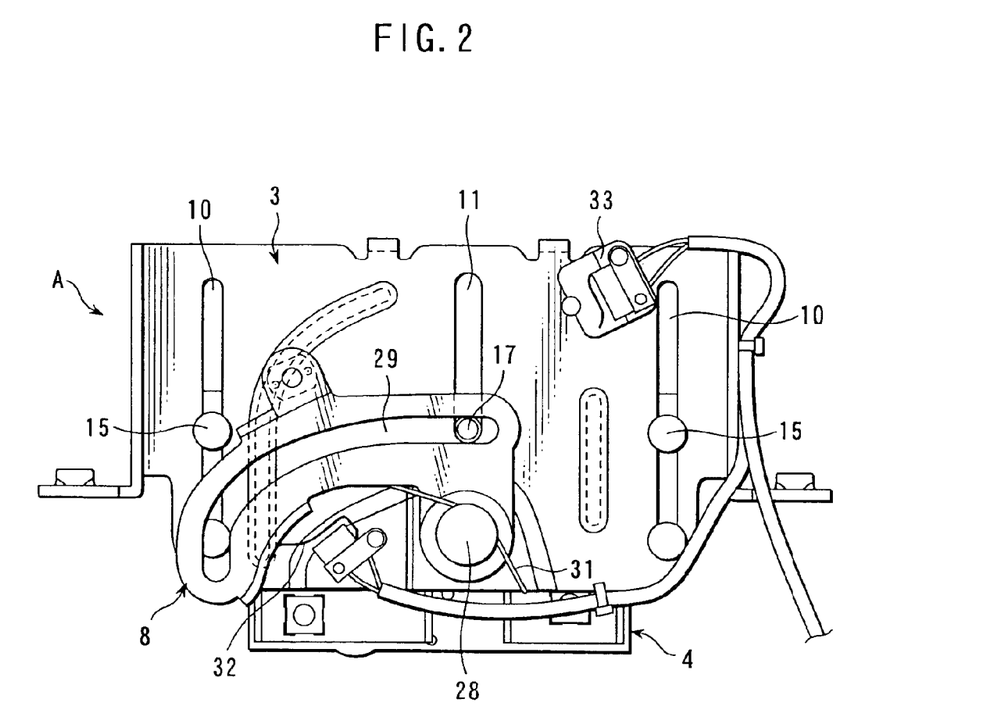
FIG. 2 is a diagram showing a rear view of the retractable roof fixing apparatus according to one embodiment of the present invention, in a state in which a striker is retracted.

The base plate 3 is mounted on the cover c at a roof mounting location by screws. Additionally, as shown in FIGS. 1 and 2, slots 10 extending vertically (that is, in a direction of movement of the striker 1) are provided along both lateral end portions of the base plate 3, and a somewhat shorter guide slot 11 is provided in between and parallel to the lateral edge slots 10.

The slide plate 4, as shown in FIGS. 3 and 4, is provided with flanges 12 on a front surface of the base plate 3, with both lateral end portions bent toward the base plate 3 and extending further outward therefrom.

Figure 6:
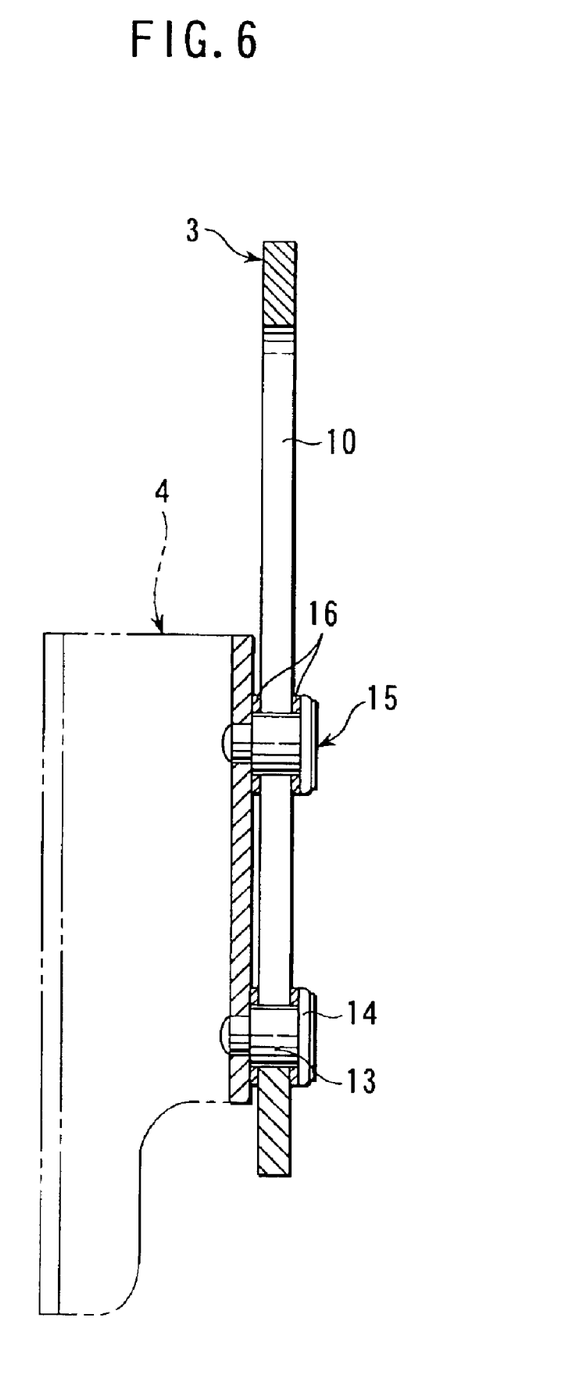
FIG. 6 is a diagram showing a rear cross-sectional view of a base plate and a slide plate.

FIG. 6 is a diagram showing a rear cross-sectional view of a base plate and a slide plate.

As shown in FIG. 6, sliders 15, each comprised of a shaft 13 and a head 14, are provided at top and bottom portions of both lateral flanges 12. A diameter of the shafts 13 is somewhat smaller than a width of the slots 10 of the base plate 3, whereas the heads 14 have a diameter that is somewhat larger than the width of the slots 10. Inserting the shaft 13 into the slot 10 through a washer 16 mounts the slider plate 4 on the base plate 3 so that the slider plate 4 slides along the slot 10.

A slide projection 17 that slidingly engages the guide slot 11 of the base plate 3 is provided at a center of a rear surface of the slide plate 4, as shown in FIGS. 1 and 2.

Additionally, a first spring 18 and a second spring 19 that urge the base plate 4 upward (that is, in a direction contacting the roof) are provided between the lateral edge slots 10 and the guide slot 11, in an area between the base plate 3 and the slide plate 4, as shown in FIG. 4.

As shown in FIGS. 3 and 4, the cover plate 5 is mounted on a front surface of the slide plate 4 (that is, a surface on the opposite side of the base plate 3), and is provided with a striker entry slot 20 formed in a central part of a top edge of the cover plate 5.

The latch 6 is mounted on one side of the striker entry slot 20 of the cover plate 5 by a first shaft 21, and the detent lever 7 is mounted on an opposite side thereof by a second shaft 22 so as to be adjacent to the latch 6.

A notch 23 adapted to engage the striker 1 is formed on a periphery of the latch 6, with one side of a tip of the notch 23 formed into a striking surface 24.

In an open state, in which the striker 1 is not engaged, the striking surface 24 is disposed laterally across the striker entry slot 20 of the cover plate 5, in the direction of the roof a.

When the striker 1 advances into the striker entry slot 20 and strikes the striking surface 24, the impact of such contact causes the latch 6 to rotate to the right in the diagram, and the notch 23 enters a closed state, lying substantially perpendicularly across the striker entry slot 20 while fully enclosing the striker 1. In such a state, the striker 1 cannot escape from the notch 23.

Additionally, continuous with the striking surface 25, an outer peripheral surface of the latch 6 disposed opposite the detent lever 7 is formed into the shape of an arc.

An engagement projection 25 is formed on an edge of the detent lever 7 disposed opposite the latch 6. A third spring 26 is interposed between the latch 6 and the detent lever 7. The engagement projection 25 of the detent lever 7 is urged toward the latch 6 (that is, rotates to the right in the diagram).

It should be noted that the latch 6 is urged in a direction of release (that is, rotates to the left in the diagram) by the third spring 26.

When the latch 6 is in a state of release and the striking surface 24 lies across the striker entry slot 20, the engagement projection 25 of the detent lever 7 contacts the outer periphery of the curve of the latch 6.

After the striker 1 strikes the striking surface 24 and begins to rotate to the right, the engagement projection 25 moves along the outer peripheral surface of the latch 6 until the latch 6 enters a closed state, at which time the engagement projection 25 engages the striking surface 24, thereby restricting a leftward rotation (that is, rotation in the direction of release) of the latch 6.

When the detent lever 7, which is in a rotation restriction position that restricts rotation of the latch 6 is itself rotated, that is, rotated leftward against the force of the third spring 26, the engagement between the striking surface 24 and the engagement projection 25 is released and the latch 6 is pulled by the third spring 26 and rotated in one motion to a release position.

An engagement-release mechanism involving the striker 1, latch 6 and detent lever 7 like that described above is conventionally well known, and therefore a description using diagrams is omitted.

It should be noted that, a first switch 27 is provided at a position at which the cover plate 5 is disposed opposite the detent lever 7. The first switch 7 detects when the latch 6 has moved to a locked position and the detent lever 7 has rotated to a rotation restriction position, and starts the motor 9, and also detects when the detent lever 7 has returned to its original position from the rotation restriction position and the latch 6 has moved to the release position, and reverses the motor 9.

The cam 8, as shown in FIGS. 1 and 2, is mounted on a rear surface of the base plate 3 so as to rotate about a third shaft 28 provided below the guide slot 11.

The cam 8 is further provided with a cam slot 29 that is curved so that a distance from the third shaft 28 gradually increases from one end to the other, with the slide projection 17 of the slide plate 4 slidingly engaged by the cam slot 29.

Figure 5:
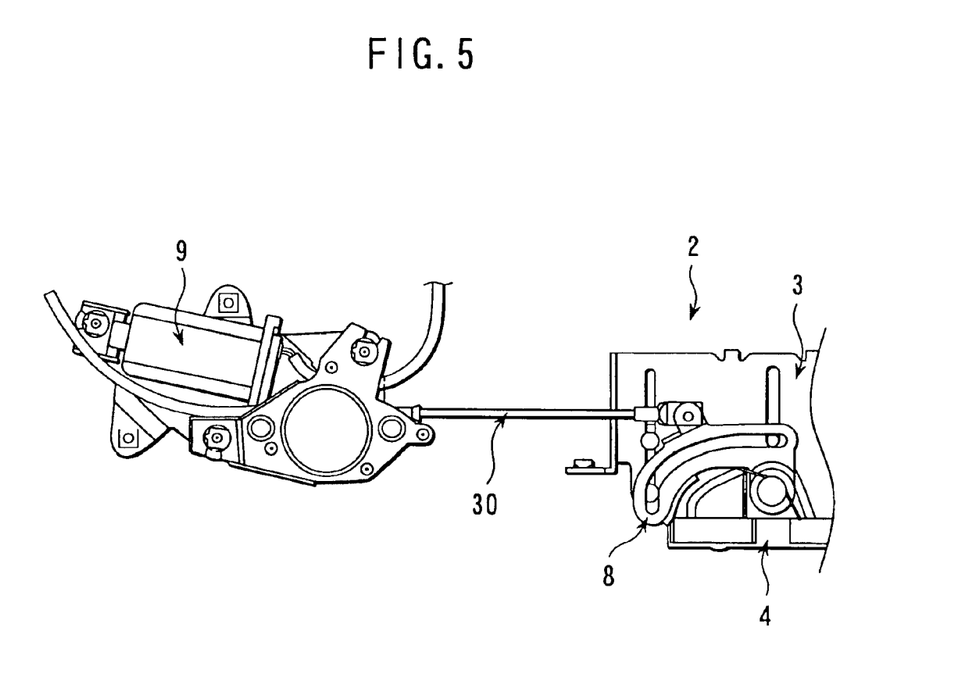
FIG. 5 is a diagram showing a rear view of a motor and a cam.

Additionally, as shown in FIG. 5, when the cam 8 is connected to the motor 9 by a geared cable 30, such as disclosed in JP 6-294455A, and the motor 9 is run in either forward or reverse, the cam 8 rotates either clockwise or counter-clockwise.

When the motor 9 is engaged and the cam 8 rotates, the slide projection 17 engaging the cam slot 29 separates from the third shaft 28 and slides between a top end and a bottom end of the guide slot 11. As a result, the slide plate 4, as well as the latch 6 and detent lever 7 mounted on the slide plate 4 by the cover plate 5, move vertically with respect to the base plate 3. At this time, the sliders 15 provided at the top and bottom of both sides of the slide plate 4 engage the slots 10 and the slide plate 4 is supported at four points by the base plate 3 so as to slide smoothly and without rattling along a stable track.

It should be noted that the length of the guide slot 11, that is, a distance through which the slide plate 4 ascends and descends, is approximately 40 mm.

Additionally, the cam 8, as shown in FIGS. 1 and 2, is urged by a fourth spring 31 so that the slide projection 17 ascends (that is, the cam 8 moves toward the right in the diagrams).

Both end portions of the cam slot 29 are substantially straight lines while an intermediate portion of the cam slot 29 curved in approximately an arc, and when the slide projection 17 engages either end of the cam slot 29, the cam slot 29 intersects the guide slot 11 at substantially a right angle.

Therefore, when the slide projection 17 engages the ends of the cam slot 29, in other words, when the slide plate 4 is positioned at either a top dead center position or a bottom dead center position, so long as the motor is not engaged, the cam 8 does not rotate and move the slide plate 4 up or down.

Additionally, because the ends of the cam slot 29 are substantially straight lines, the slide plate 4, in the vicinity of the top dead center position (that is, a position at which the striker 1 strikes the latch 6) or the bottom dead center position (that is, the retraction limit position) thereof, does not move greatly either up or down even if the cam 8 rotates, and thus the load on the motor 9 is small.

At the same time, when the slide projection 17 engages an intermediate portion of the cam slot 29, and the slide plate 4 is in the process of moving up or down, the load on the motor 9 is large and the extent of the movement of the slide plate 4 with respect to the extent of rotation of the cam 8 increases.

Further, as shown in FIG. 2, a second switch 32 is provided on the rear surface of the base plate 3 that detects the position of the cam 8 and stops the motor 9 when the cam 8 is fully rotated leftward (hereinafter "bottom dead center") and the slide projection 17 is positioned at one end of the cam slot 29 (that is, the end near the third shaft 28) so as to engage the bottom end of guide slot 11, together with a third switch 33 as shown in FIG. 1 that detects the position of the cam 8 and stops the motor 9 when the cam 8 is fully rotated rightward (hereinafter "top dead center") and the slide projection 17 is positioned at the other, distal end of the cam slot 29 (that is, the end far from the third shaft 28) so as to engage the top end of the guide slot 11.

Next, a description is given of steps in the operation of the retractable roof fixing apparatus A.

In a state in which the roof a is not mounted on the vehicle body b, as shown in FIG. 1 the cam 8 is at a top dead center, the slide projection 17 engages the distal end of the cam slot 29 and the slide plate 4 is at a top dead center position.

At this time, the latch 6 and the detent lever 7 provided on the slide plate 4 also ascend, and although not shown, the latch 6 is in a released state and the engagement projection 25 of the detent lever 7 contacts the peripheral surface of the curve of the latch 6.

When the roof a is closed (that is, retracted) the striker 1 enters the striker entry slot 20 of the cover plate 5 and strikes the striking surface 24 of the latch 6, whereupon the impact of such contact rotates the latch 6 and, as shown in FIG. 3, the striker 1, which has engaged the notch 23 of the latch 6, is retracted approximately 5–7 mm.

Additionally, with the rotation of the latch 6, the engagement projection 25 of the detent lever 7 moves along the outer periphery of the latch 6, and when the latch 6 reaches the closed position, the engagement projection 25 engages the striking surface 24 so as to restrict reverse rotation of the latch 6. The first switch 27 then detects that the detent lever 7 has reached the rotation restriction position and starts the motor 9, and the cam 9 begins to rotate to the left.

When the cam rotates to the left, the slide projection 17 engaging the cam slot 29 gradually approaches the third shaft 28 and descends along the guide slot 11. As a result, the slide plate 4 and the latch 6 and detent lever 7 that move with the slide plate 4 descend, and the striker, which has engaged the latch 6, is pulled toward the body b.

It should be noted that, when the slide plate 4 and the slide projection 17 approach the top dead center position, the force with which the roof a attempts to lift the latch 6 is small, and the extent of retraction of the slide projection 17 with respect to the extent of rotation of the cam 8 is small, and therefore the load on the motor can remain small.

When the slide plate 4 and the slide projection 17 approach the bottom dead center position (the retraction limit position), the lifting force of the roof a gradually increases and the force attempting to rotate the cam in reverse also increases.

By contrast, when the slide projection 17 approaches the bottom dead center position, the angle of intersection of the cam slot 29 of the cam rotating so as to approach bottom dead center and the guide slot 11 gradually approaches a right angle, and therefore the extent of the retraction of the slide projection 17 with respect to the extent of rotation of the cam 8 gradually diminishes, so the cam 8 can be rotated with only a small amount of force.

Therefore, the load on the motor 9, which increases due to the force attempting to rotate the cam 8 in reverse, is offset, and the cam 8 can be rotated efficiently.

As shown in FIG. 2, when the cam reaches bottom dead center, the second switch 32 detects it and stops the motor 9, thus stopping the slide plate 4 and latch 6 at the bottom dead center position as shown in FIG. 4. At this time, the striker 1, which has engaged the latch 6, is further retracted approximately another 40 mm beyond that retraction when the latch 6 is at the top dead center position.

Additionally, in the state described above, the slide projection 17 engages the straight part of the cam slot 29 intersecting the guide slot 11 at a right angle, and therefore the slide plate 4 does not ascend even if a force that attempts to lift up the latch 6 is exerted through the striker 1.

When the detent lever 7 is rotated and the engagement between the engagement projection 25 and the striking surface 24 is released, the latch 6, which is urged by the first spring 18, returns to the release position, the striker 1 escapes from the notch 23 and the base of the roof a separates from the cover c.

Simultaneously, the first switch 27 is activated, the motor 9 rotates in reverse and the cam 8 rotates to the right. As a result, slide projection 17, which engages the cam slot 29, gradually withdraws from the third shaft 28, ascending along the guide slot 11.

With the ascent of the slide projection 17, the slide plate 4, the latch 6 and the detent lever 7 also rise.

When the cam 8 reaches top dead center, the third switch 33 detects it and stops the motor. At this time, the slide plate 4 returns to the top dead center position and the latch 6, rotated to the release position, returns to a position to receive the above-described striker 1.

According to the present embodiment, when the striker engages the latch, the latch not only rotates and retracts the striker but also the latch itself slides away from the roof and further greatly retracts the striker, thus enabling the roof to be securely fixed to the body.

A description is now given of a second embodiment of the present invention.

It should be noted that the basic structure and function of the second embodiment are identical to those of the first embodiment described above, and therefore a description thereof is omitted here.

According to the second embodiment of the present invention, a slide projection is provided on the slide plate, the slide projection engages the cam, the cam has a cam slot that slides the slide projection in the direction of movement of the striker with a rotation of the cam, and the cam slot has a shape that gradually decreases retraction when the slide projection approaches a retraction limit position.

One end of the cam slot 29 (that is, the end near the third shaft 28) is substantially straight over a comparatively long distance, with the other end formed straight over a shorter distance and an intermediate portion curved in approximately an arc. When the slide projection 17 engages either end of the cam slot 29 and either end of the guide slot 11 at the same time, the cam slot 29 intersects the guide slot 11 at substantially a right angle.

Therefore, when the slide projection 17 engages the ends of the cam slot 29, in other words, when the slide plate 4 is positioned at either a top dead center position or a bottom dead center position, the force that attempts to slide the slide projection 17 along the guide slot 11 works at a right angle to the cam slot 29, and therefore, so long as the motor is not started, the cam 8 does not rotate and move the slide plate 4 up or down even as the striker 1 attempts to push the latch 6 down or pull the latch 6 up.

Additionally, because the ends of the cam slot 29 intersect the guide slot 11 at approximately right angles as described above, the slide projection 17, in the vicinity of the top dead center position (that is, a position at which the striker 1 strikes the latch 6) or the bottom dead center position (that is, the retraction limit position) thereof, does not move greatly either up or down even if the cam 8 rotates, and thus the load on the motor 9 is small.

It should be noted that, when the slide plate 4 and the slide projection 17 approach the top position, the force with which the roof a attempts to lift the latch 6 is small, and the extent of retraction of the slide projection 17 with respect to the extent of rotation of the cam 8 is small, and therefore the load on the motor can remain small.

When the slide plate 4 and the slide projection 17 approach the bottom position (the retraction limit position), the lifting force of the roof a gradually increases and the force attempting to rotate the cam in reverse also increases.

By contrast, when the slide projection 17 approaches the bottom position, the angle of intersection of the cam slot 29 of the cam rotating so as to approach bottom dead center and the guide slot 11 gradually approaches a right angle, and therefore the extent of the retraction of the slide projection 17 with respect to the extent of rotation of the cam 8 gradually diminishes, so the cam 8 can be rotated with only a small amount of force.

Therefore, the load on the motor 9, which increases due to the force attempting to rotate the cam 8 in reverse, is offset, and the cam 8 can be rotated efficiently.

According to the second embodiment of the present invention as described above, when the striker engages the latch, the latch not only rotates and retracts the striker but also the latch itself slides away from the roof and further greatly retracts the striker, thus enabling the roof to be securely fixed to the body.

Additionally, although the load on the motor increases due to the force with which the roof attempts to lift the latch as the slide projection approaches the retraction limit position, the extent of the retraction of the slide projection gradually diminishes and the rotation of the cam can be accomplished with only a small amount of force. As a result, any increase in the load on the motor can be limited.

A description is now given of a third embodiment of the present invention. It should be noted that the basic structure and function of the third embodiment are identical to those of the first embodiment described above, and therefore a description thereof is omitted here.

According to the third embodiment of the present invention, the base plate has lateral slots along both lateral portions thereof, with the lateral slots extending in a direction of movement of the striker, and further has sliders mounted at top and bottom portions along both lateral portions of the slide plate slidably engage the lateral slots, with the base plate provided with a guide slot situated between and parallel to the lateral slots, a slide projection provided on an intermediate portion of the slide plate slidingly engages the guide slot, and the cam is provided with a cam slot that engages the slide projection and slides the slide projection along the guide slot as the cam rotates.

Both end portions of the cam slot 29 are substantially straight lines while an intermediate portion of the cam slot 29 curved in approximately an arc, and when the slide projection 17 engages either end of the cam slot 29, the cam slot 29 intersects the guide slot 11 at substantially a right angle.

Therefore, when the slide projection 17 engages the ends of the cam slot 29, in other words, when the slide plate 4 is positioned at either a top dead center position or a bottom dead center position, so long as the motor is not engaged, the cam 8 does not rotate and move the slide plate 4 up or down.

Additionally, because the ends of the cam slot 29 are substantially straight lines, the slide plate 4, in the vicinity of the top dead center position (that is, a position at which the striker 1 strikes the latch 6) or the bottom dead center position (that is, the retraction limit position) thereof, does not move greatly either up or down even if the cam 8 rotates, and thus the load on the motor 9 is small.

According to the third embodiment as described above, when the striker engages the latch, the latch not only rotates and retracts the striker but also the latch itself slides away from the roof and further greatly retracts the striker, thus enabling the roof to be tightly fixed to the body.

Additionally, the slide plate that supports the latch is itself supported at four points by the base plate, and therefore moves smoothly along a stable track. As a result, the latch that retracts the striker also moves smoothly and without rattling.

A description is now given of a fourth embodiment of the present invention. It should be noted that the basic structure and function of the fourth embodiment are identical to those of the first embodiment described above.

According to a fourth embodiment of the present invention, a geared cable connects the motor and the cam, a first spring is disposed between the slide plate and the base plate so as to urge the slide plate toward the roof, and a second spring is disposed between the cam and the base plate so as to rotate the cam in a direction that draws the slide plate toward the roof.

One end of the cam slot 29 (that is, the end near the third shaft 28) is substantially straight over a comparatively long distance, with the other end formed straight over a shorter distance and an intermediate portion curved in approximately an arc. When the slide projection 17 engages either end of the cam slot 29 and either end of the guide slot 11 at the same time, the cam slot 29 intersects the guide slot 11 at substantially a right angle.

Therefore, when the slide projection 17 engages the ends of the cam slot 29, in other words, when the slide plate 4 is positioned at either a top position or a bottom position, so long as the motor is not started, the cam 8 does not rotate and move the slide plate 4 up or down.

Additionally, because the ends of the cam slot 29 are substantially straight lines, the slide plate 4, in the vicinity of the top position (that is, a position at which the striker 1 strikes the latch 6) or the bottom position (that is, the retraction limit position) thereof, does not move greatly either up or down even if the cam 8 rotates, and thus the load on the motor 9 is small.

According to the fourth embodiment as described above, when fixing the roof, a striker mounted on the roof strikes a latch, the impact of which causes the latch to rotate and engage the striker. When the striker and latch are engaged, the motor rotates the cam that is connected to the motor by the geared cable, sliding a slide plate and the latch mounted thereon away from the roof, thus greatly drawing the latch-engaged striker, together with the roof, toward the body of the vehicle.

When the striker is released from the latch, a tensile force exerted on the geared cable via the cam by the force of the striker lifting the latch suddenly disappears. However, the springs tensioning the slide plate and the cam apply a tensile force to the geared cable to prevent the geared cable from buckling.

A description is now given of a fifth embodiment of the present invention. It should be noted that the basic structure and function of the fifth embodiment are identical to those of the first embodiment described above, and therefore a description thereof is omitted here.

According to the fifth embodiment of the present invention, the base plate has a pair of guide slots extending in a direction of movement of the striker as well as a pair of slide projections provided on the slide plate slidingly that engage the guide slots, with the cam provided with a pair of cam slots that engage the slide projections and slide the slide projections along the guide slots as the cam rotates.

Both end portions of the cam slot 29 are substantially straight lines while an intermediate portion of the cam slot 29 curved in approximately an arc, and therefore when the slide projection 17 engages the ends of the cam slot 29 and the ends of the guide slots 11, the cam slots 29 intersect the guide slots 11 at substantially a right angle.

Therefore, when the slide projections 17 engage the ends of the cam slots 29, in other words, when the slide plate 4 is positioned at either a top dead center position or a bottom dead center position, so long as the motor is not engaged, the cam 8 does not rotate and move the slide plate 4 up or down.

Additionally, because the ends of the cam slot 29 are substantially straight lines, the slide plate 4, in the vicinity of the top dead center position (that is, a position at which the striker 1 strikes the latch 6) or the bottom dead center position (that is, the retraction limit position) thereof, does not move greatly either up or down even if the cam 8 rotates, and thus the load on the motor 9 is small.

According to the fifth embodiment of the present invention as described above, when the slide projections are at end portions of the guide slots, that is, at a top dead center position and a bottom dead center position, the edge portions of the cam slots formed as straight lines are disposed perpendicular to the guide slots, such that, even with a force exerted so as to slide the slide projections along the guide slots, such force acts at right angles to the cam slots, and therefore the cam does not rotate, and as a result, the slide plate does not slide without the motor being engaged.

It should be noted that the shape of the latch and the detent lever, and the construction and mounting positions of the springs, are not limited to that shown in the diagrams.

The present invention is not limited to the above-described embodiments, and various modifications may be made thereto within the spirit and scope of the present invention. Therefore, in order to apprise the public of the scope of the present invention, the following claims are made.

What is claimed is:

1. A retractable roof fixing apparatus comprising:
   a striker fixed on a roof;
   a base plate fixed on a body of a vehicle;
   a slide plate slidably attached to the base plate in a direction of movement of the striker;
   a latch rotatably mounted on the slide plate that engages the striker with a rotation of the latch;
   a cam rotatably mounted on the base plate; and
   a motor that rotates the cam,
   wherein the motor operates when the striker engages the latch to rotate the cam so as to slide the slide plate away from the roof.

2. The retractable roof fixing apparatus according to claim 1, wherein the base plate is provided with a guide slot in the direction of movement of the striker, the slide plate has a slide projection that engages the guide slot, and the cam has a cam slot that engages the slide projection to slide the slide projection along the guide slot as the cam rotates.

3. The retractable roof fixing apparatus according to claim 1, wherein the slide plate has a slide projection, the cam has a cam slot that engages the cam to slide the slide projection in the direction of movement of the striker with a rotation of the cam, and the cam slot has a shape that gradually decreases retraction when the slide projection approaches a retraction limit position.

4. The retractable roof fixing apparatus according to claim 3, wherein the base plate is provided with a guide slot in the direction of movement of the striker, the slide projection engages the guide slot, and the shape of the cam slot at an engaging portion that engages when the slide projection approaches an end portion opposite the roof of the guide slot is such that an angle of intersection between the engaging portion and the guide slot gradually approaches a right angle as the cam rotates.

5. The retractable roof fixing apparatus according to claim 1, wherein the base plate has lateral slots along both lateral portions thereof, the lateral slots extending in a direction of movement of the striker, and the slide plate is provided with sliders at top and bottom portions along both lateral portions thereof to slidably engage the lateral slots.

6. The retractable roof fixing apparatus according to claim 5, wherein the base plate is provided with a guide slot situated between and parallel to the lateral slots, a slide projection provided on an intermediate portion of the slide plate slidingly engages the guide slot, and the cam is provided with a cam slot that engages the slide projection and slides the slide projection along the guide slot as the cam rotates.

7. The retractable roof fixing apparatus according to claim 1, further comprising:

a geared cable connecting the motor and the cam;

a first spring disposed between the slide plate and the base plate urging the slide plate toward the roof; and a second spring disposed between the cam and the base plate rotating the cam in a direction that draws the slide plate toward the roof.

8. The retractable roof fixing apparatus according to claim 7, wherein the first spring is disposed along each lateral surface of the slide plate and the base plate so as to urge the slide plate toward the roof.

9. The retractable roof fixing apparatus according to claim 1, wherein the base plate is provided with a guide slot extending in a direction of movement of the striker, the slide plate has a slide projection slidingly engaging the guide slot, and the cam has a cam slot that engages the slide projection and slides the slide projection along the guide slot as the cam rotates, the cam slot having straight end portions disposed substantially perpendicular to the guide slot when the slide projection reaches the straight end portions of the cam slot.

* * * * *